(12) United States Patent
Tkaczyk et al.

(10) Patent No.: US 7,696,483 B2
(45) Date of Patent: Apr. 13, 2010

(54) HIGH DQE PHOTON COUNTING DETECTOR USING STATISTICAL RECOVERY OF PILE-UP EVENTS

(75) Inventors: John Eric Tkaczyk, Delanson, NY (US); Samit Kumar Basu, Niskayuna, NY (US); Wen Li, Clifton Park, NY (US); Yanfeng Du, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/837,328

(22) Filed: Aug. 10, 2007

(65) Prior Publication Data

US 2009/0039273 A1 Feb. 12, 2009

(51) Int. Cl.
*G01T 1/24* (2006.01)
(52) U.S. Cl. .................................. 250/370.06
(58) Field of Classification Search ........... 250/370.01–370.15; 378/19
See application file for complete search history.

(56) References Cited

U.S. PATENT DOCUMENTS 4,879,464 A * 11/1989 Iinuma .................. 250/361 R

2004/0251420 A1 * 12/2004 Sun .......................... 250/370.09
2006/0056581 A1 * 3/2006 Hoffman et al. .............. 378/19
2007/0120062 A1 * 5/2007 Li et al. ................... 250/370.09

OTHER PUBLICATIONS

Perenzoni et al., "A Multi-Spectral Analog Photon Counting Readout Circuit for X-Ray Hybrid Pixel Detectors," 2006, IEEE IMTC 2006—Instrumentation and Measurement Technology Conference, Sorrento, Italy, pp. 2003-2006.*
Goldan et al., "Selective Photon Counter for Digital X-ray Mammography Tomosynthesis," 2006, Proceedings of SPIE, vol. 6142, pp. 61425B-1-61425B-9.*

* cited by examiner

*Primary Examiner*—David P Porta
*Assistant Examiner*—Kiho Kim
(74) *Attorney, Agent, or Firm*—Scott J. Asmus (57) ABSTRACT

A photon-counting detector includes a direct conversion material and a data acquisition system with a first comparator having a first signal level threshold indicative of a noise level of a spectrum of photons, the first comparator configured to output a count when the electrical signal level exceeds the first signal level threshold, and a second comparator having a second signal level threshold indicative of the maximum energy of the spectrum of photons, the second comparator configured to output a count when the electrical signal exceeds the second signal level threshold where a photon count is determined based on the counts from the first and second comparators.

21 Claims, 6 Drawing Sheets

FIG. 8

HIGH DQE PHOTON COUNTING DETECTOR USING STATISTICAL RECOVERY OF PILE-UP EVENTS

BACKGROUND OF THE INVENTION

The present invention relates generally to diagnostic imaging and, more particularly, to a method and apparatus of statistical recovery of pile-up events in a photon counting detector.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about a gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

Conventional CT imaging systems utilize detectors that convert radiographic energy into current signals that are integrated over a time period, then measured and ultimately digitized. A drawback of such detectors however is their inability to provide data or feedback as to the number and/or energy of photons detected. That is, conventional CT detectors have a scintillator component and photodiode component wherein the scintillator component illuminates upon reception of radiographic energy and the photodiode detects illumination of the scintillator component and provides an electrical signal as a function of the intensity of illumination.

While it is generally recognized that CT imaging would not be a viable diagnostic imaging tool without the advancements achieved with conventional CT detector design, a drawback of these detectors is their inability to provide energy discriminatory data or otherwise count the number and/or measure the energy of photons actually received by a given detector element or pixel. That is, the light emitted by the scintillator is a function of the number of x-rays impinged as well as the energy level of the x-rays. Under the charge integration operation mode, the photodiode is not capable of discriminating between the energy level or the photon count from the scintillation. For example, two scintillators may illuminate with equivalent intensity and, as such, provide equivalent output to their respective photodiodes. Yet, the number of x-rays received by each scintillator may be different as well as the x-rays intensity, but yield an equivalent light output.

Recent detector developments have included the design of an energy discriminating, direct conversion detector that can provide photon counting and/or energy discriminating feedback with high spatial resolution. In this regard, the detector can be caused to operate in an x-ray counting mode, an energy measurement mode of each x-ray event, or both. These energy discriminating, direct conversion detectors are capable of not only x-ray counting, but also providing a measurement of the energy level of each x-ray detected. While a number of materials may be used in the construction of a direct conversion energy discriminating detector, semiconductors have been shown to be one preferred material. Typical materials for such use includes Cadmium Zinc Telluride (CZT) or Cadmium Telluride (CdTe) having a plurality of pixilated anodes at attached thereto.

A drawback of direct conversion semiconductor detectors, however, is that these types of detectors cannot count at the x-ray photon fluxes typically encountered with conventional CT systems, e.g. at or above $10^6$ counts per sec per millimeter squared. Saturation can occur at detector locations wherein small subject thickness is interposed between the detector and the radiographic energy source or x-ray tube. These saturated regions correspond to paths of low subject thickness near or outside the width of the subject projected onto the detector fan-arc. In many instances, the subject is more or less circular or elliptical in the effect on attenuation of the x-ray flux and subsequent incident intensity to the detector. In this case, the saturated regions represent two disjointed regions at extremes of the fan-arc. In other less typical, but not rare instances, saturation occurs at other locations and in more than two disjointed regions of the detector. In the case of an elliptical subject, the saturation at the edges of the fan-arc is reduced by the imposition of a bowtie filter between the subject and the x-ray source. Typically, the filter is constructed to match the shape of the subject in such a way as to equalize total attenuation, filter and subject, across the fan-arc. The flux incident to the detector is then relatively uniform across the fan-arc and does not result in saturation.

What can be problematic, however, is that the bowtie filter may not be optimal given that a subject population is significantly less than uniform and not exactly elliptical in shape. In such cases, it is possible for one or more disjointed regions of saturation to occur or conversely to over-filter the x-ray flux and create regions of very low flux. Low x-ray flux in the projection will ultimately contribute to noise in the reconstructed image of the subject.

"Pile-up" is a phenomenon that occurs when a source flux at the detector is so high that there is a non-negligible possibility that two or more X-ray photons deposit charge packets in a single pixel close enough in time so that their signals interfere with each other. Pile-up phenomenon are of two general types, which result in somewhat different effects. In the first type, the two or more events are separated by sufficient time so that they are recognized as distinct events, but the signals overlap so that the precision of the measurement of the energy of the later arriving x-ray or x-rays is degraded. This type of pile-up results in a degradation of the energy resolution of the system. In the second type of pile-up, the two or more events arrive close enough in time so that the system is not able to resolve them as distinct events. In such a case, these events are recognized as one single event having the sum of their energies and the events are shifted in the spectrum to higher energies. In addition, pile-up leads to a more or less pronounced depression of counts in high x-ray flux, resulting in detector quantum efficiency (DQE) loss.

Direct conversion detectors are also susceptible to a phenomenon called "polarization" where charge trapping inside the material changes the internal electric field, alters the detector count and energy response in an unpredictable way, and results in hysteresis where response is altered by previous exposure history.

This pile-up and polarization ultimately leads to detector saturation which occurs at relatively low x-ray flux level thresholds in direct conversion sensors. Above these thresholds, the detector response is not predictable and has degraded dose utilization that leads to loss of imaging information and results in noise and artifacts in X-ray projection and CT images. In particular, photon counting, direct conversion detectors saturate due to the intrinsic charge collection time (i.e. dead time) associated with each x-ray photon event. Saturation will occur due to pulse pile-up when x-ray photon absorption rate for each pixel is on the order of the inverse of this charge collection time.

Photon counting systems typically have one or more energy bins that are determined by a comparator that typically is part of the readout DAS. For a one-bin system, typically one energy threshold of the comparator is set to an energy value that is high enough such that there are few or no false noise counts, but low enough such that there is little loss of signal x-rays in the readout process. Such a system is subject to statistical error and bias due to the pile-up of multiple energy events, as described.

A system having many energy bins may be formed with multiple comparators in the readout DAS. Each comparator may be set to trigger for photons above a set level of energy that results in accumulation on a register of the number of photons above a corresponding x-ray energy level. The bin counts may be weighted and added together to form a system output having specific information content appropriate for an imaging system. However, like a one-bin system, a multiple-bin system is subject to degradation due to pile-up, resulting in DQE loss. The mean pile-up of bin counts may be corrected, but with a loss of statistical accuracy. The signal-to-noise ratio (SNR) may be used to assess the weighted sums for a system output. The DQE may be determined as $1/(1+N/N_0)$, where $N_0=1/\text{deadtime}$. The DQE may likewise be described as $SNR^2$ (output)/$SNR^2$ (input).

As an example, for a constant flux incident upon a non-paralyzable photon counting system with one comparator (i.e., one energy bin), the mean output counts M is related to the mean actual number of events N in the detector by the DQE as a multiplicative factor, which quantifies the statistical information loss as decreased $SNR^2$. In other words, $M=DQE*N$. A Poisson distribution may be recovered if each output count is divided by this factor M, however, there will still be a loss of statistical information as quantified by the DQE. Similarly, for detectors having multiple energy bins, deconvolution techniques exist for correction of the mean spectral distortion created by pile-up. However, each energy bin likewise experiences a loss of $SNR^2$.

Therefore, it would be desirable to design an apparatus and method improving statistical recovery of pile-up events through loss of DQE.

BRIEF DESCRIPTION OF THE INVENTION

The present invention is a directed method and apparatus for improving statistical recovery of pile-up events through the loss of DQE.

An energy discriminating CT detector capable of photon counting is disclosed. The CT detector includes a semi-conductor layer having a plurality of pixilated anodes attached thereto. The CT detector supports not only x-ray photon counting, but energy measurement or tagging as well. As a result, the present invention supports the acquisition of both anatomical detail as well as tissue characterization information. In this regard, the energy discriminatory information or data may be used to reduce the effects of beam hardening and the like. Furthermore, these detectors support the acquisition of tissue discriminatory data and therefore provide diagnostic information that is indicative of disease or other pathologies. This detector can also be used to detect, measure, and characterize materials that may be injected into the subject such as contrast agents and other specialized materials by the use of optimal energy weighting to boost the contrast of iodine and calcium (and other high atomic or materials). Contrast agents can, for example, include iodine that is injected into the blood stream for better visualization.

According to one aspect of the present invention, a photon-counting detector includes a direct conversion material having an array of electrical contacts and constructed to directly convert an energy of at least one incident photon to an electrical signal indicative of the energy level of the at least one individual photon and a data acquisition system (DAS). The DAS includes a first comparator having a first signal level threshold that is less than an electrical signal level that is indicative of a maximum energy of a spectrum of photons, the first comparator configured to output a count when the electrical signal level exceeds the first signal level threshold, and a second comparator having a second signal level threshold that is greater than or equal to the electrical signal level indicative of the maximum energy of the spectrum of photons, the second comparator configured to output a count when the electrical signal exceeds the second signal level threshold. The DAS further includes an electrical readout layer electrically connected to the array of electrical contacts and designed to route the electrical signal to the DAS, and a device configured to determine a photon count based on the counts from the first and second comparators and to output the photon count for image reconstruction.

In accordance with another aspect of the invention, a method of photon-counting includes converting an energy of at least one incident photon upon a direct conversion material to an electrical signal indicative of the energy of the at least one incident photon, adding a count to a first bin when a level of the electrical signal indicates the energy of the at least one incident photon is above a first energy level of an input spectrum of photons, and adding a count to a second bin when the level of the electrical signal indicates the energy of the at least one incident photon is above the second energy level of the input spectrum of photons. The method further includes determining a count total based on the count in the first bin and the count in the second bin and at least temporarily storing the count total to computer memory.

Yet another aspect of the present invention includes a radiographic imaging system including a radiation source configured to project a spectrum of x-ray photons toward a subject to be scanned, a photon-counting detector configured to receive at least one x-ray photon of the spectrum of x-ray photons that is attenuated by the subject, and output an electrical signal indicative of an energy level of the at least one photon, and a data acquisition system (DAS). The DAS includes a first comparator having a first threshold set below a level corresponding to a photon having a maximum energy of the spectrum of photons, the first comparator configured to output a first signal when the electrical signal exceeds the first threshold, a second comparator having a second threshold set at or above a level corresponding to a photon having the maximum energy of the spectrum of photons, the second comparator configured to output a second signal when the electrical signal exceeds the second threshold, and a summing device configured to sum first and second signals and output a photon count.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The operating environment of the present invention is described with respect to a sixty-four-slice computed tomography (CT) system. However, it will be appreciated by those skilled in the art that the present invention is equally applicable for use with other multi-slice configurations. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT systems.

Figure 1:
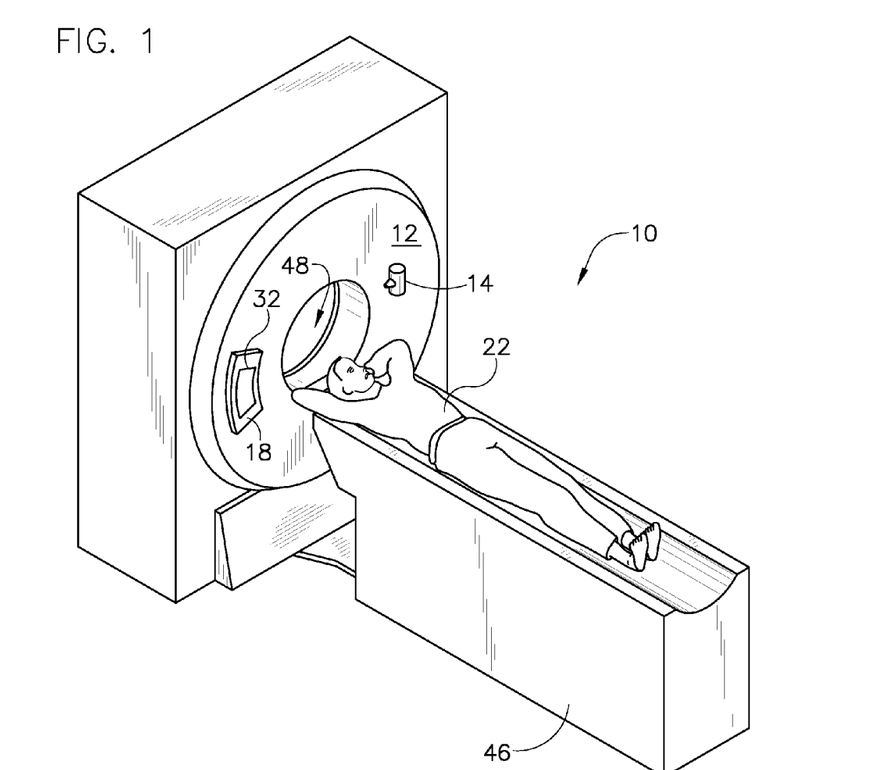
FIG. 1 is a pictorial view of a CT imaging system.
Figure 2:
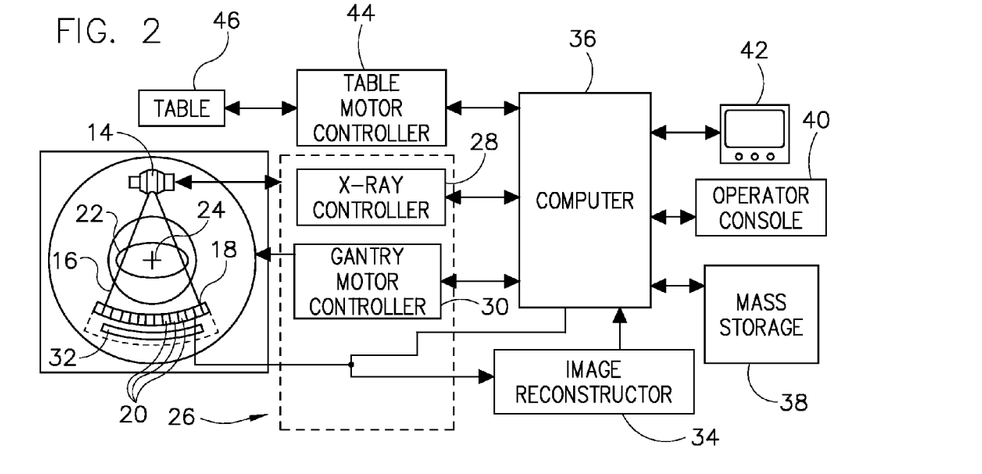
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays 16 toward a detector assembly or collimator 18 on the opposite side of the gantry 12. Referring now to FIG. 2, detector assembly 18 is formed by a plurality of detectors 20 and data acquisition systems (DAS) 32. The plurality of detectors 20 sense the projected x-rays that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
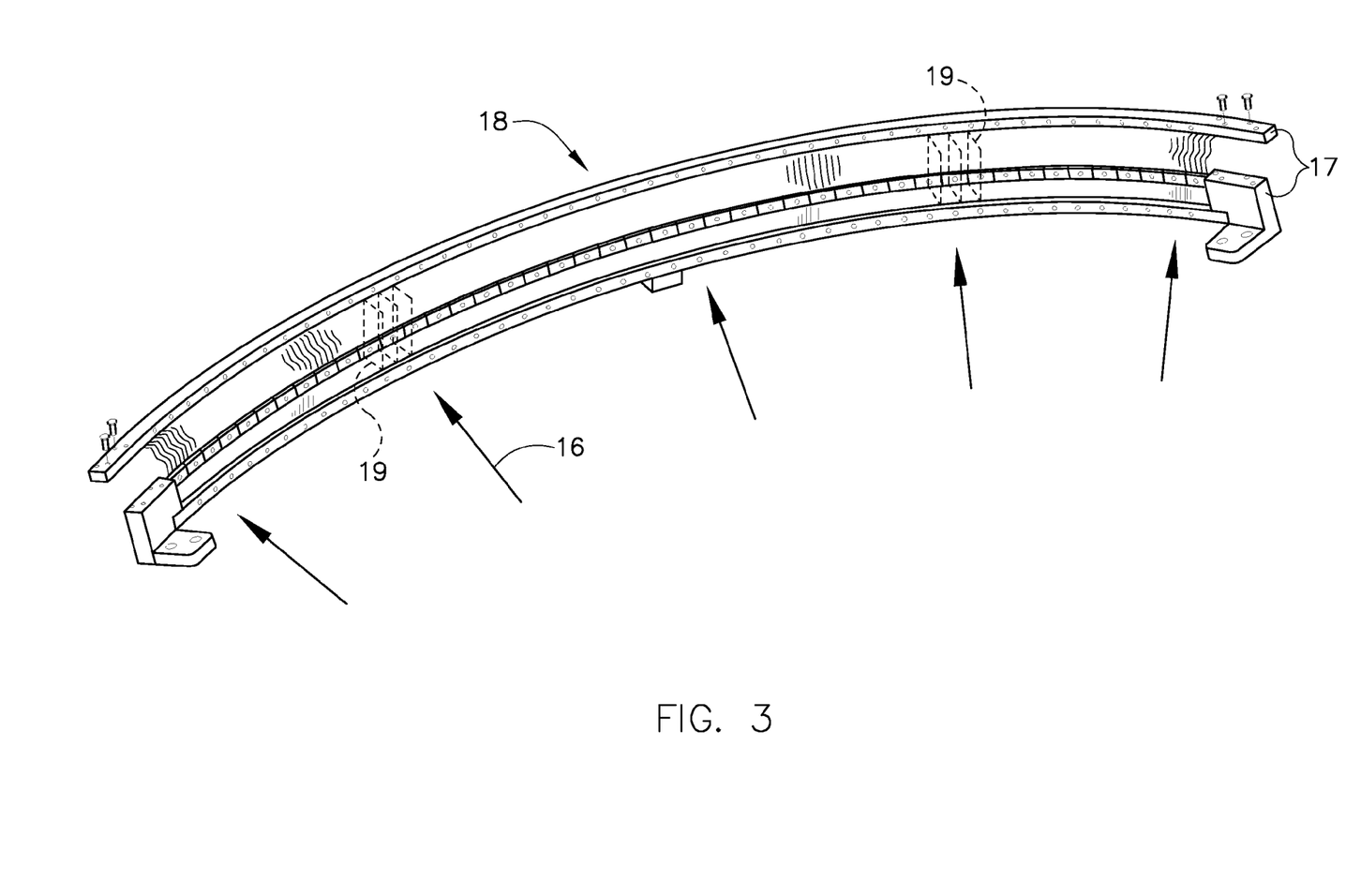
FIG. 3 is a perspective view of one embodiment of a CT system detector array.

As shown in FIG. 3, detector assembly 18 includes rails 17 having collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Figure 4:
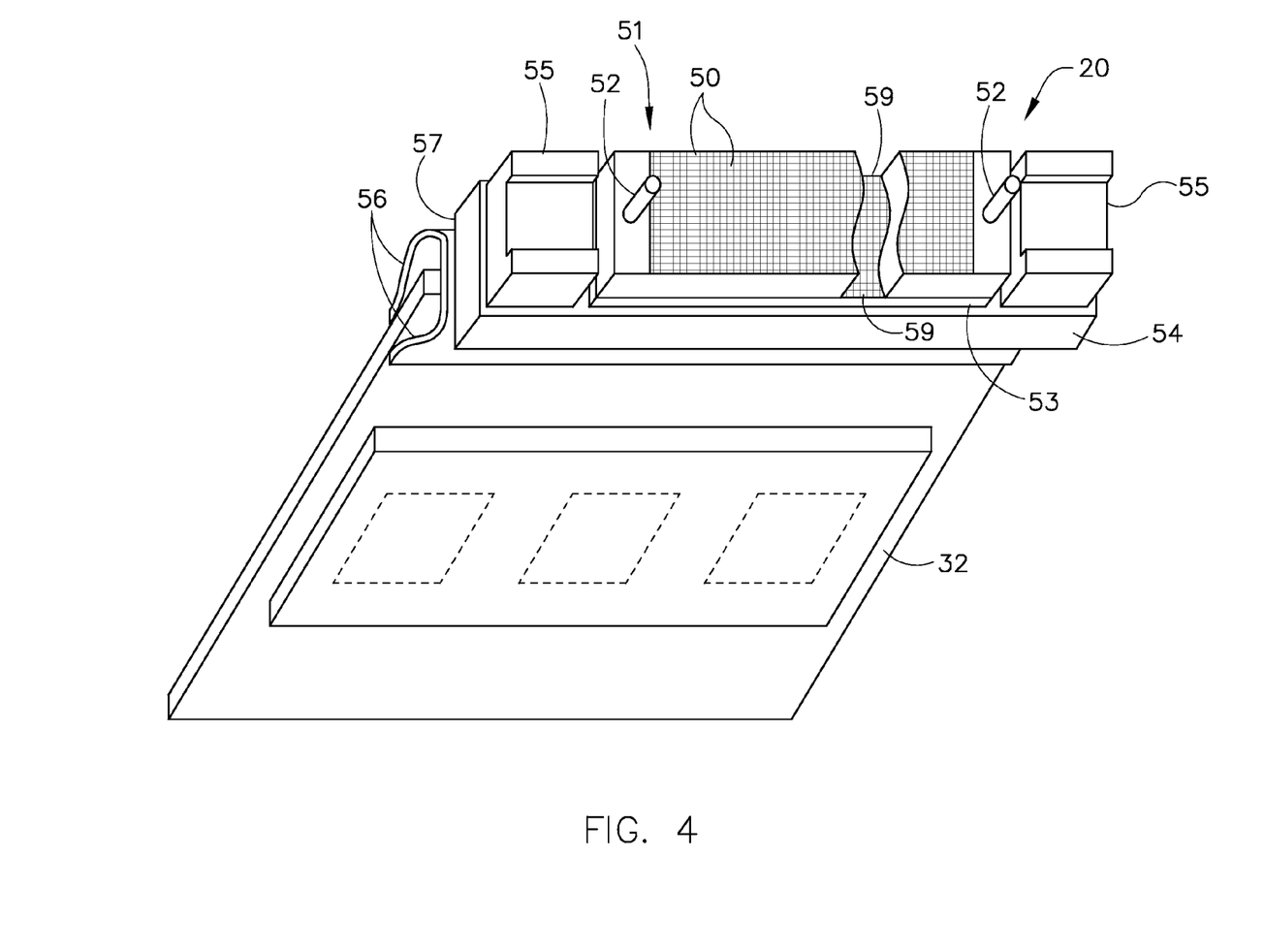
FIG. 4 is a perspective view of one embodiment of a detector.

Referring to FIG. 4, detector 20 includes DAS 32, with each detector 20 including a number of detector elements 50 arranged in pack 51. Detectors 20 include pins 52 positioned within pack 51 relative to detector elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Detector elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In the operation of one embodiment, x-rays impinging within detector elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

As described above, each detector 20 may be designed to directly convert radiographic energy to electrical signals containing energy discriminatory or photon count data. In a preferred embodiment, each detector 20 includes a semiconductor layer fabricated from CZT. Each detector 20 also includes a plurality of metallized anodes attached to the semiconductor layer. As will be described, such detectors 20 may include an electrical circuit having multiple comparators thereon which may reduce statistical error due to pileup of multiple energy events.

Figure 5:
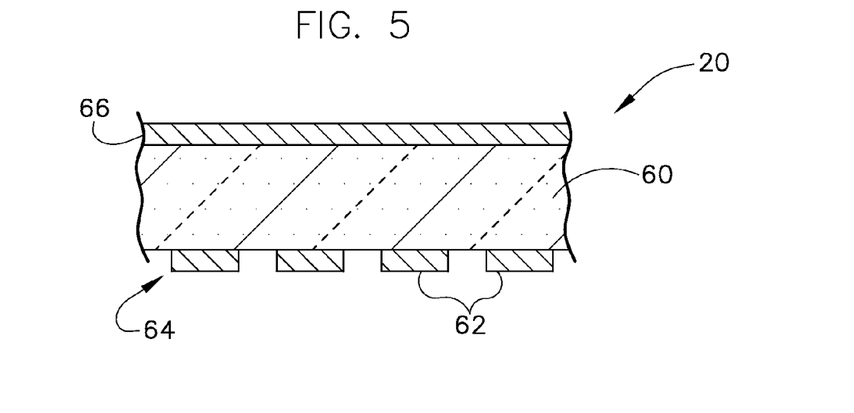
FIG. 5 is a view of one embodiment of a direct conversion detector.

Referring now to FIG. 5, a portion of a CZT or direct conversion detector in accordance with one embodiment of the present invention is shown. Detector 20 is defined by a semiconductor layer 60 having a number of electronically pixilated structures or pixels to define a number of detector elements, anodes, or contacts 62. This electronic pixilation is accomplished by applying a 2D array 64 of electrical contacts 62 onto a layer 60 of direct conversion materials.

Detector 20 includes a contiguous high-voltage electrode 66 attached to semiconductor layer 60. The high-voltage electrode 66 is connected to a power supply (not shown) and it is designed to power the semiconductor layer 60 during the x-ray detection process. One skilled in the art will appreciate that the high-voltage layer 66 should be relatively thin so as to reduce the x-ray absorption characteristics and, in a preferred embodiment, is a few hundred angstroms in thickness. In a preferred embodiment, the high-voltage electrode 66 may be a fixed to the semiconductor layer 60 through a metallization process. X-ray photons that impinge upon the semiconductor layer 60 will generate an electrical charge therein, which is collected in one or more of the electrical contacts 62, and which may be read out to the DAS 32 of FIG. 2. The amplitude of the charge collected is indicative of the energy of the photon that created the charge.

Figure 6:
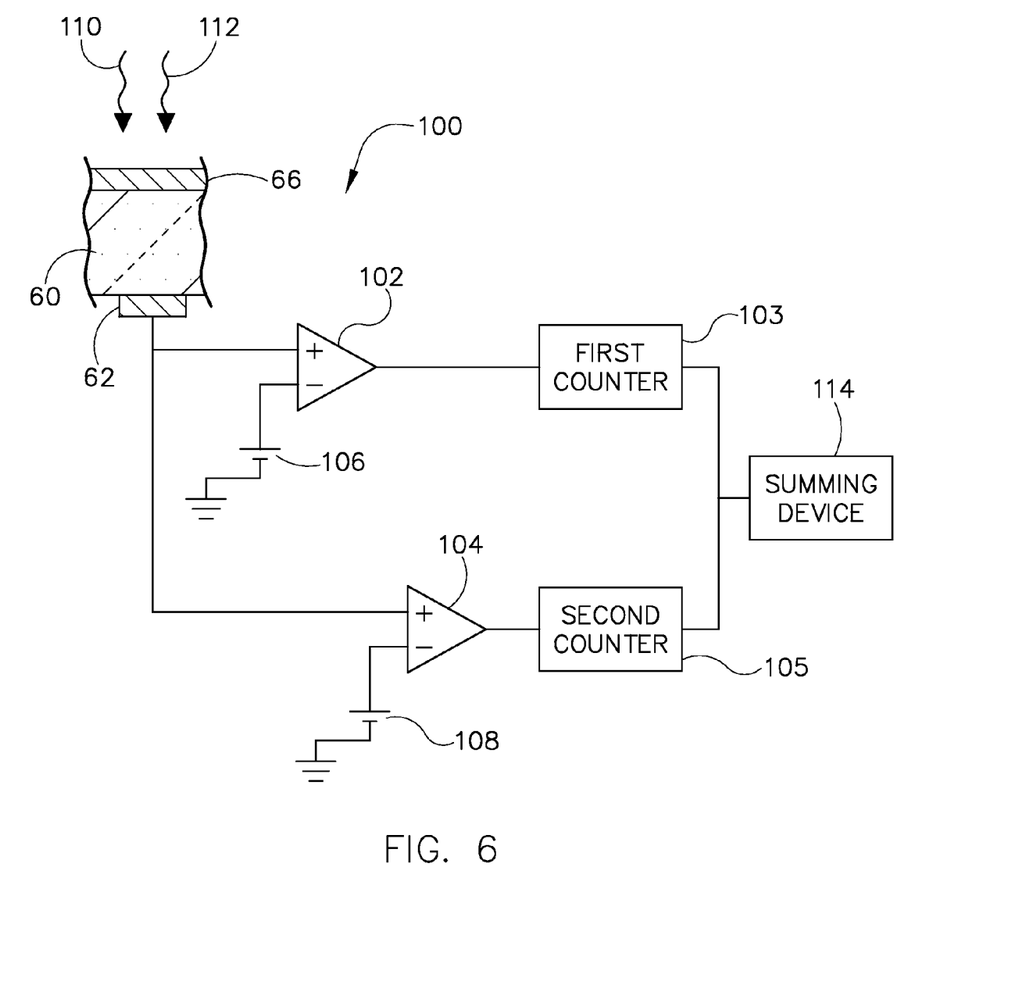
FIG. 6 is an illustration of a summing electrical circuit according to an embodiment of the present invention.

Referring now to FIG. 6, a summing circuit 100 in relation to a single pixel is illustrated according to an embodiment of the present invention. The single pixel includes semiconductor layer 60, high-voltage electrode 66, and an electrical contact 62. The electrical circuit 100 includes a first comparator 102 electrically connected to a first counter 103, and electrical circuit 100 includes a second comparator 104 electrically connected to a second counter 105. The first comparator 102 has a reference voltage 106 setting a threshold for a voltage that, in one embodiment, corresponds to a noise level of, for instance, 30 keV photons. As such, the summing circuit 100 will be biased in a fashion such that noise in the system will not trigger a false event as may happen when, for instance, a reference voltage 106 is set below the noise level of for instance 30 keV. It is contemplated, however, that reference voltage 106 may be designed to correspond to a level other than a noise level. The second comparator 104 has a reference voltage 108 setting a threshold for a voltage that, in one embodiment, corresponds to a maximum photon energy level of the incoming spectrum for a single photon that may be, for instance, between 120 and 160 keV. In a particular embodiment, the maximum photon energy level of the incoming spectrum is approximately 140 keV.

In operation, when a single incoming photon 110 impinges upon the semiconductor layer 60, a charge is generated therein that corresponds to the photon energy level of the photon 110. The charge is collected on the anode 62 and directed to both comparators 102, 104. For the single incoming photon, the energy of such a photon will typically fall in a range between the noise level and the maximum photon energy level of the incoming spectrum. Accordingly, because the photon 110 may have an energy level that typically exceeds the noise level but does not exceed the maximum photon energy level of the incoming spectrum, the first bin or counter 103 will be caused to increment its count, typically by one, and the second bin, or counter 105 will not be caused to increment.

However, during a pileup event, two incoming photons 110, 112 may simultaneously, or nearly simultaneously, impinge upon the semiconductor layer 60 during the readout period of the electronics. During such an event, the combined energy of the two photons 110, 112 may exceed the maximum photon energy level of the incoming spectrum for a single photon. Accordingly, a charge generated within the semiconductor layer 60 will be collected in the anode 62 having a charge that exceeds both reference voltages 106, 108. Thus, both comparators 102, 104, will be caused to increment their counts since the collected charge during the pileup event will be greater than both the noise level and at the maximum photon energy level of the incoming spectrum.

As an example, during a pileup event, incoming photons 110, 112 may have a combined energy of, for instance, 170 keV. Accordingly, the charge collected in the anode 62 corresponds to a charge that exceeds the reference value 106 (which may correspond to, as an example, a background noise level of 30 keV) of the first comparator 102, thus incrementing the counter of the first counter 103. Likewise, the charge collected in the anode 62, (170 keV) also exceeds the reference value of the second comparator 108 (which may be, as an example, 140 keV), thus incrementing the counter of the second counter 105. Accordingly, the pileup event described will cause the summing device 114 to receive an increment from each of the counters, 103, 105, thus incrementing the summing device 114 by a count of two.

Figure 7:
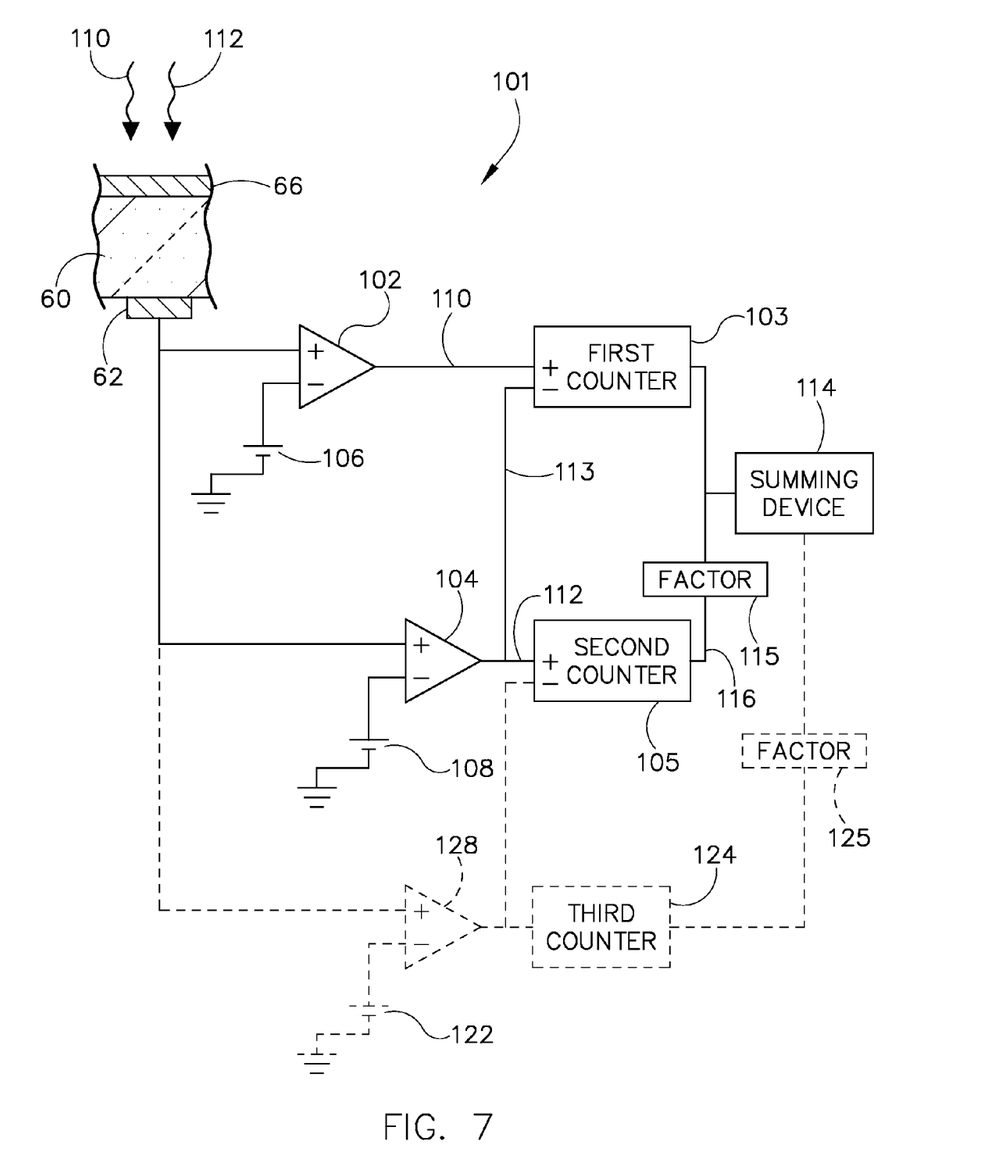
FIG. 7 is an illustration of a summing electrical circuit according to an alternate embodiment of the present invention.

FIG. 7 illustrates a summing circuit according to an alternate embodiment of the present invention having an alternate electrical connectivity between the comparators 102, 104, and counters 103, 105. In this embodiment, comparators 102, 104 may be arranged to separately count charges collected that fall between reference voltages 106, 108, and count charges that are above reference voltage 108. Signals are routed from anode 62 to at least comparators 102, 104. Comparator 102 is routed to the first counter 103 through signal line 110. Signals are also routed from comparator 104 to both the first counter 103 through signal line 113, and to the second counter 105 through signal line 112. A signal arriving in the first counter 103 from the first comparator 102 through line 110 is designated as "+" and a signal arriving in the first counter 103 from the second comparator 104 through line 112 is designated as "−". Accordingly, a signal arriving in the first counter 103 from both comparators 102, 104 will cancel and the first counter 103 will not increment under such a condition. However, an electrical signal having a charge that exceeds threshold 106 but does not exceed threshold 108 will only cause first counter 103 to increment by sending the signal to the first counter 103 through the "+" line. Furthermore, an electrical signal having a charge that exceeds the threshold 108 in comparator 104, such as during a pileup event, will cause the summing device to count by a factor 125 times the count in the second counter 116. In one embodiment, factor 125 is 2, and in an alternate embodiment, factor 125 is a function of the incoming flux.

As an example, during a pileup event, incoming photons 110, 112 may have a combined energy of, for instance, 170 keV. An electrical signal generated in anode 62 will be directed to both comparators 102, 104. As such, if the signal exceeds threshold 108 then the first counter 103 will receive a "+" indication for the signal carried through line 110 from the first comparator 102, and a "−" indication for the signal carried through line 113 and passed from the second comparator 104. As such, the first counter 103 will not increment because of the off-setting signals arriving in both the "+" and "−" lines. Furthermore, because the electrical signal exceeds threshold 108, the electrical signal will be passed from the second comparator 104 to the second counter 105. The second counter 105 thereby sends a count, or increment, to the summing device 114 through line 116, which may be multiplied by a factor of, for instance, 2. In an alternative embodiment, signals carried through line 116 are instead compounded by a factor 125 that is a function of the incoming flux of photons.

Thus, a summing device 114, which may include a logic circuit, may sum the outputs of both counters 103, 105 and provide a total count of incident photons, thereby more accurately counting the number of photon hits during a pileup event. In one embodiment, as illustrated in FIG. 6, two simple thresholds are exceeded, thereby causing two comparators 102, 104 to each increment a count through respective counters 103, 105 to summing device 114. In an alternative embodiment, as illustrated in FIG. 7, a window is formed between thresholds 106, 108, and a simple threshold 108 is further used, and when the second threshold is exceeded, the first counter is not incremented but the second counter is incremented by a factor. The factor may be two, or may be a value that is a function of the photon flux. Thus, the statistical error due to pileup, hence the DQE, is improved in both embodiments due to a more accurate count being obtained of incoming photons during a pileup event.

One skilled in the art will recognize that summing circuits 100, 101 need not be limited to two comparators. For instance, as illustrated in phantom in FIG. 7, a third comparator 128 may be added having a reference voltage 122 that is for instance two times that of the maximum energy level of the incoming spectrum of photons. Additionally, a third counter 124 may be included to output a third count to summing device 114. Accordingly, an event, or pileup, that occurs having an energy level greater than two times the maximum energy level of the incoming spectrum of photons, may be caused to add, for example, three counts to the total count. For instance, a pileup event having three photons incident upon a detector element within a charge collection window may cause a total charge generated in an anode to correspond to, for instance, 300 keV. Accordingly, for the third comparator 128 having reference voltage 122 set to, for instance, 280 keV, a collected charge of 300 keV would cause the counter in third counter 124 to increment by a factor 125 (i.e. either 3 or a factor that is a function of the incoming photon flux) while counters of the first and second counters 103, 105 would not be incremented.

One skilled in the art will further recognize that additional comparators than the ones illustrated may be added to either of the circuits described above in FIGS. 6 and 7 that have reference values corresponding to, for example, whole number increments of the maximum energy level of the incoming spectrum of photons. In other words, for a maximum energy level of the incoming spectrum of photons of 140 keV, additional comparators may be used in a similar fashion as described above having reference values of not only 280 keV, but also 420 keV and beyond.

One skilled in the art will further recognize that, although the embodiments described herein are illustrated as summing circuits with the use of comparators, counters, and a summing device, such functionality can also be obtained by the used of software, firmware, or other hardware.

Figure 8:
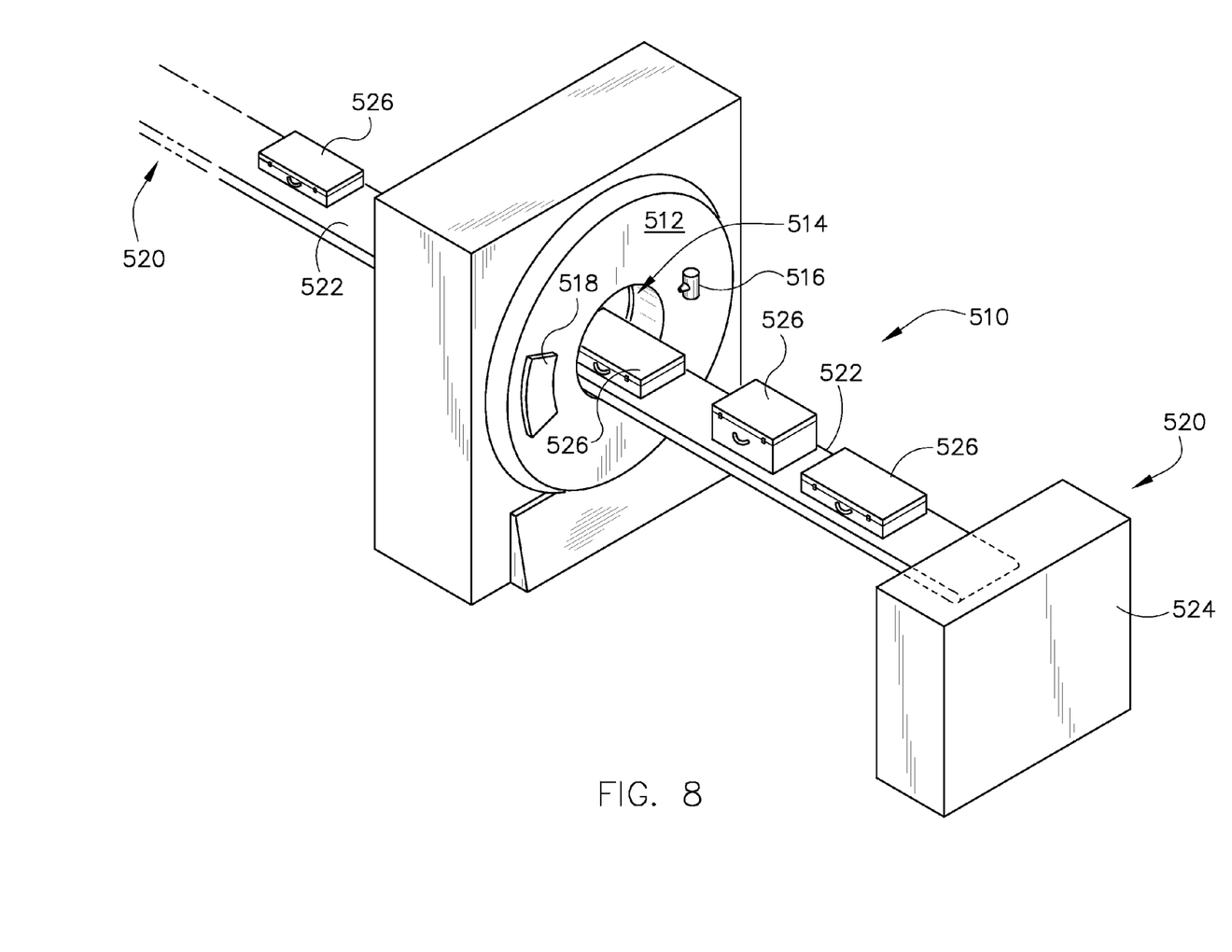
FIG. 8 is a pictorial view of a CT system for use with a non-invasive package inspection system.

Referring now to FIG. 8, package/baggage inspection system 510 includes a rotatable gantry 512 having an opening 514 therein through which packages or pieces of baggage may pass. The rotatable gantry 512 houses a high frequency electromagnetic energy source 516 as well as a detector assembly 518 having scintillator arrays comprised of scintillator cells similar to that shown in FIG. 6 or 7. A conveyor system 520 is also provided and includes a conveyor belt 522 supported by structure 524 to automatically and continuously pass packages or baggage pieces 526 through opening 514 to be scanned. Objects 526 are fed through opening 514 by conveyor belt 522, imaging data is then acquired, and the conveyor belt 522 removes the packages 526 from opening 514 in a controlled and continuous manner. As a result, postal inspectors, baggage handlers, and other security personnel may non-invasively inspect the contents of packages 526 for explosives, knives, guns, contraband, etc.

Therefore, according to one embodiment of the present invention, a photon-counting detector includes a direct conversion material having an array of electrical contacts and constructed to directly convert an energy of at least one incident photon to an electrical signal indicative of the energy level of the at least one individual photon and a data acquisition system (DAS). The DAS includes a first comparator having a first signal level threshold that is less than an electrical signal level that is indicative of a maximum energy of a spectrum of photons, the first comparator configured to output a count when the electrical signal level exceeds the first signal level threshold, and a second comparator having a second signal level threshold that is greater than or equal to the electrical signal level indicative of the maximum energy of the spectrum of photons, the second comparator configured to output a count when the electrical signal exceeds the second signal level threshold. The DAS further includes an electrical readout layer electrically connected to the array of electrical contacts and designed to route the electrical signal to the DAS, and a device configured to determine a photon count based on the counts from the first and second comparators and to output the photon count for image reconstruction.

In accordance with another embodiment of the present invention, a method of photon-counting includes converting an energy of at least one incident photon upon a direct conversion material to an electrical signal indicative of the energy of the at least one incident photon, adding a count to a first bin when a level of the electrical signal indicates the energy of the at least one incident photon is above a first energy level of an input spectrum of photons, and adding a count to a second bin when the level of the electrical signal indicates the energy of the at least one incident photon is above the second energy level of the input spectrum of photons. The method further includes determining a count total based on the count in the first bin and the count in the second bin and at least temporarily storing the count total to computer memory.

Yet another embodiment of the present invention includes a radiographic imaging system including a radiation source configured to project a spectrum of x-ray photons toward a subject to be scanned, a photon-counting detector configured to receive at least one x-ray photon of the spectrum of x-ray photons that is attenuated by the subject, and output an electrical signal indicative of an energy level of the at least one photon, and a data acquisition system (DAS). The DAS includes a first comparator having a first threshold set below a level corresponding to a photon having a maximum energy of the spectrum of photons, the first comparator configured to output a first signal when the electrical signal exceeds the first threshold, a second comparator having a second threshold set at or above a level corresponding to a photon having the maximum energy of the spectrum of photons, the second comparator configured to output a second signal when the electrical signal exceeds the second threshold, and a summing device configured to sum first and second signals and output a photon count.

The present invention has been described in terms of the preferred embodiment, and it is recognized that equivalents, alternatives, and modifications, aside from those expressly stated, are possible and within the scope of the appending claims.

What is claimed is:

1. A photon-counting detector comprising:
   a direct conversion material having an array of electrical contacts and constructed to directly convert an energy of at least one incident photon to an electrical signal on a first electrical contact;
   a data acquisition system having:
      a first comparator with a first signal level threshold corresponding to a first photon energy level, the first comparator configured to increment a first counter when the level of the electrical signal exceeds the first signal level threshold;
      a second comparator having a second signal level threshold corresponding to a second photon energy level greater than the first photon energy level, the second comparator configured to increment a second counter when the level of the electrical signal exceeds the second signal level threshold;

an electrical readout layer electrically connected to the array of electrical contacts and designed to route the electrical signal on the first electrical contact to the first comparator and to the second comparator; and a device connected to the first counter for receiving a first count and connected to the second counter for receiving a second count, the device configured to determine a photon count by multiplying the second count by a factor and summing the result with the first count.

2. The photon-counting detector of claim 1 wherein the at least one incident photon is emitted from a high frequency electromagnetic emission source configured to emit photons toward the direct conversion material.

3. The photon-counting detector of claim 1 wherein the data acquisition system further comprises a third comparator having a third signal level threshold corresponding to a third photon energy level that is approximately twice the maximum energy of an incident photon, the third comparator further configured to provide an offsetting signal to the second counter and to increment a third counter when the level of the electrical signal exceeds the third signal level threshold.

4. The photon counting detector of claim 3 wherein the third signal level threshold is at a level indicative of incident photons having approximately 280 keV energy.

5. The photon-counting detector of claim 1 wherein the first signal level threshold is at a level indicative of incident photons having approximately a background noise level.

6. The photon-counting detector of claim 5 wherein the first signal level threshold is at a level indicative of incident photons having energy of approximately 30 keV.

7. The photon-counting detector of claim 1 wherein the second signal level threshold is at a level indicative of incident photons having energy between 120 and 160 keV.

8. The photon-counting detector of claim 1 wherein the first count corresponds to electrical signals having charges lying between the first signal level threshold and the second signal level threshold, and wherein the second count corresponds to electrical signals having charges greater than the second signal level threshold.

9. The photon-counting detector of claim 1 wherein the factor is 2.

10. The photon-counting detector of claim 1 wherein the factor comprises a function of an incoming flux of photons.

11. The photon-counting detector of claim 1 wherein the first count corresponds to electrical signals having an energy level above the first signal level threshold, and the second count corresponds to electrical signals having an energy level above the second signal level threshold.

12. The photon-counting detector of claim 1 wherein the device comprises at least one of a computer readable storage medium, firmware, or an electronic circuit mounted on the digital acquisition system.

13. A method of photon-counting comprising:
converting energy from at least one photon incident upon a direct conversion material to an electrical signal;
adding a count to a first bin when a level of the electrical signal indicates the energy of the at least one incident photon is above a first photon energy level, the step of adding the count to the first bin including the step of excluding electrical signals of incident photons having energy levels greater than a maximum photon energy level;
adding a count to a second bin when the level of the electrical signal indicates the energy of the at least one incident photon is above the maximum photon energy level; and
summing the count in the first bin and the count in the second bin multiplied by a factor, to determine a photon count total.

14. The method of claim 13 wherein the first photon energy level corresponds to a noise energy level of the input spectrum of photons.

15. The method of claim 13 wherein the factor is 2.

16. The method of claim 13 wherein the factor comprises a function of an incoming flux of photons.

17. A radiographic imaging system comprising:
a radiation source configured to project a spectrum of x-ray photons toward a subject to be scanned;
a photon-counting detector configured to receive at least one x-ray photon of the spectrum of x-ray photons that is attenuated by the subject, and output an electrical signal indicative of an energy level of the at least one photon;
a data acquisition system including:
a first comparator for receiving the electrical signal, the first comparator having a first threshold set at or above a level corresponding to a noise energy level of the input spectrum of photons, the first comparator configured to output a first signal to a first counter when the electrical signal exceeds the first threshold;
a second comparator for receiving the electrical signal, the second comparator having a second threshold set below a level corresponding to a photon having the maximum energy of the spectrum of photons, the second comparator configured to output a second signal to a second counter when the electrical signal exceeds the second threshold; and
a summing device configured to receive a first count from the first counter and a second count from the second counter, and output a sum of the first count and a factor multiplied by the second count as a photon count.

18. The radiographic imaging system of claim 17 wherein the first count corresponds to electrical signals having energy levels between the first comparator threshold and the second comparator threshold, and the factor is 2.

19. The radiographic imaging system of claim 17 wherein the first threshold is set to an energy level corresponding to approximately a background noise level of the spectrum of photons.

20. The radiographic imaging system of claim 17 wherein the first threshold is set to an energy level corresponding to approximately 30 keV photons.

21. The radiographic imaging system of claim 17 wherein the second threshold is set to an energy level corresponding to approximately 140 keV photons.

* * * * *